United States Patent
Fielding

[11] Patent Number: 5,927,084
[45] Date of Patent: Jul. 27, 1999

[54] AIR CONDITIONING SYSTEM

[75] Inventor: Robert Michael Fielding, Blyth, United Kingdom

[73] Assignee: Domnick Hunter Limited, County Durham, United Kingdom

[21] Appl. No.: 08/973,826

[22] PCT Filed: Jun. 10, 1996

[86] PCT No.: PCT/GB96/01372

§ 371 Date: Feb. 4, 1998

§ 102(e) Date: Feb. 4, 1998

[87] PCT Pub. No.: WO96/41725

PCT Pub. Date: Dec. 27, 1996

[30] Foreign Application Priority Data

Jun. 9, 1995 [GB] United Kingdom .................. 9511683

[51] Int. Cl.⁶ .............................. B60H 3/06; F24F 3/16; F24F 5/00
[52] U.S. Cl. .................... 62/90; 62/96; 95/96; 96/128
[58] Field of Search .......................... 62/267, 331, 419, 62/89, 90, 94, 96; 95/96, 98, 106; 96/128, 135

[56] References Cited

U.S. PATENT DOCUMENTS

| | | | |
|---|---|---|---|
| 4,732,579 | 3/1988 | Veltman et al. | 95/96 |
| 4,769,051 | 9/1988 | Defranco et al. | |
| 4,793,832 | 12/1988 | Veltman et al. | 96/128 |
| 5,151,022 | 9/1992 | Emerson et al. | |
| 5,203,889 | 4/1993 | Brown | 96/128 |
| 5,298,054 | 3/1994 | Malik | 95/99 |
| 5,453,112 | 9/1995 | Sinicropi et al. | 95/41 |

FOREIGN PATENT DOCUMENTS

| | | |
|---|---|---|
| 2 238 490 | 6/1991 | United Kingdom . |
| 94 03 123 | 2/1994 | United Kingdom . |
| WO 92/05859 | 4/1992 | WIPO . |
| WO 95/05886 | 3/1995 | WIPO . |

*Primary Examiner*—William Doerrler
*Attorney, Agent, or Firm*—Darby & Darby

[57] ABSTRACT

An air conditioning system comprises first (8) and second (13) heat exchangers having first and second counterflow passages, a twin bed gas purification unit comprising (i) first (22) and second (23) parallel filter beds, (ii) valve means for directing air from an inlet to flow through the first filter bed and for directing purified air from the first bed so that a greater proportion flows to an outlet while a smaller proportion flows in counter direction as purge gas through the second bed and then to a purge outlet, (iii) a plurality of heater units (30) at spaced apart locations along each of the filter beds for heating a gas as it flows through the heater bed, and (iv) means for controlling the heater. Connecting means can direct air to flow from the air intake through the first passage of the first heat exchanger (8), through the first passage of the second heat exchanger (13) and through the air/water separator (17) to the inlet (25) of the purification unit, then from the outlet (26) of the purification unit through the second passage of the first heat exchanger (8) and through the heater (47) for delivery into the vehicle or other space in which the system is fitted. Filters (4, 5, 10 and 46) are provided for gas flowing through the system. The system includes a refrigeration unit (15, 16).

11 Claims, 2 Drawing Sheets

AIR CONDITIONING SYSTEM

This invention relates to an air conditioning system that is particularly suitable for an enclosed space such as a room, building or, in particular, a vehicle. Such systems are generally well-known and are capable of delivering air at a controlled temperature and with some degree of filtering to remove contaminants. There is, however, a need for a system that will deliver air of high purity even when operating in a heavily contaminated environment and the invention seeks to provide such a system.

Accordingly, the present invention provides an air conditioning system for conditioning air to be supplied to an enclosed space, which comprises:

(a) an air intake to be positioned externally of the space, (b) a compressor, (c) a first heat exchanger having first and second counterflow passages, (d) a second heat exchanger having first and second counterflow passages, (e) an air/water separator, (f) a twin bed gas purification unit comprising (i) first and second parallel filter beds, (ii) valve means for directing air from an inlet to flow through the first filter bed and for directing purified air from the first bed so that a greater proportion flows to an outlet while a smaller proportion flows in counter direction as purge gas through the second bed and then to a purge outlet, (iii) a plurality of heater units at spaced apart locations along each of the filter beds for heating a gas as it flows through the heater bed, and (iv) means for controlling the heater, (g) connecting means directing air to flow in series from the air intake to the compressor then through the first passage of the first heat exchanger, through the first passage of the second heat exchanger and through the air/water separator to the inlet of the purification unit, then from the outlet of the purification unit through the second passage of the first heat exchanger and through the heater for delivery into the space, (h) a plurality of filters for filtering gas flowing through the system, and (i) a closed circuit refrigerant unit including means for circulating cooled refrigerant through the second passage of the second heat exchanger and means for cooling the exterior of a heat exchange section of the refrigerant unit.

In operation, the compressor drives the air through the system, the air is pre-filtered before passing into the first heat exchanger, and is further filtered before passing into the second heat exchanger. In the first heat exchanger some pre-cooling is effected by the counterflow air coming from the purification unit; in the second heat exchanger further cooling is effected by the counterflowing refrigerant. This further cooling has the additional effect of condensing water from the air, and this water is removed by the air/water separator. The cool, dry air is then passed into the purification unit. The filter medium contained within each filter bed of this unit may be any medium appropriate to the particular purification that is to be effected. It will usually be a bed of granular or other adsorbent material, which may be a desiccant material, a microporous material or a mesoporous material or a combination of two or more such materials.

Impurities contained in the air flowing through the filter bed from the air/water separator are adsorbed within that bed and purified air leaves the bed. A minor proportion of this air is directed through the second of the parallel beds as purge air to strip previously adsorbed impurities from that bed and discharge them from the system, usually back to atmosphere. The major proportion of the purified air is directed to the first heat exchanger where it pre-cools the incoming air and is itself warmed. A final filter after the first heat exchanger removes any dust or other particulate material that may have carried over from the purification unit, the air is then heated to the required temperature and delivered into the space.

The system is compact, is capable of delivering air of very high purity and is energy-efficient. Preferably the purge outlet gas is allowed to depressurise after leaving the purification unit and is then directed over the external heat exchange section of the refrigerant unit. The depressurisation expands and cools the air and the resulting flow of cool air can be sufficient to give effective cooling of the refrigerant unit before exhausting to atmosphere. This further enhances the energy efficiency of the system. It is, however, not essential, and cooling of the refrigerant unit could be effected by a separate fan, by air admitted through an inlet flap, for example when the unit is for use on a vehicle and the vehicle is moving, or by a combination of such methods.

Twin bed gas purification units are in themselves well known. They may be of the pressure swing adsorption (PSA) type or the pressure and temperature swing adsorption (PTSA) type. While either type is usable in the system of the invention the PTSA type is preferred, in which the purge gas is heated before or during its passage through the second bed. This particularly enhances effective operation. It is known that adsorption of impurities is more efficient at lower temperatures. Conversely, desorption from the bed is less effective at lower temperatures. Using the refrigerant unit to cool the air before it passes through the purification unit therefore allows highly efficient adsorption, while adopting the PTSA concept and heating the purge air allows efficient desorption of the bed being regenerated.

The heater units included in a PTSA system can use a conventional 120 or 240 volt AC supply, or a low voltage direct current supply, for example the 12 or 24 volt supply available from a vehicle battery. The heater that immediately precedes the air delivery will preferably use the same supply. Suitable heater units can comprise at least one coherent sheet of porous, electrically conductive material capable of being heated by passage of current across the sheet, and terminals connectable to an appropriate supply, the terminals being in electrical contact with the or each sheet at two spaced-apart locations thereon or across its thickness.

A particularly preferred heater unit for the filter beds has a disc configuration and can be arranged across its filter bed, the disc having openings extending across it through which the air passing through the filter bed can pass. Preferably, at least three heater units are provided in each of the filter beds, for example four or more heater units.

The provision of heater units in the form of discs has the advantage that it allows the packing arrangement of the filter material in the filter beds to be maintained without being disturbed, for example by insertion of a heating element for the regeneration of the filter material. Furthermore, the use of perforated discs within the filter material for heating the filter material by means of a flowing gas has the advantage of efficient heat transfer, both from the heater units to the gas and then to the filter material; this can be achieved without a significant pressure drop in the gas flowing through the filter medium. This has significant advantages in terms of the control which can be achieved over the heating of the filter material. Gas passing over the filter material to regenerate it can be heated quickly allowing the material to be regenerated quickly. Furthermore, the use of separate heater units spaced apart along the filter beds can allow filter material in different spaced apart regions of the filter beds to reach its regeneration temperature quickly. Moreover, filter material in different regions of the filter beds to be heated to different temperatures and for different periods.

The heater units are preferably controlled so as to limit the maximum temperature to which the filter bed is heated. For example, the heater units can comprise a material which has a positive temperature coefficient of resistivity (PTC). Suitable materials include semiconductive barium titanates whose resistivity can be arranged to increase at the Curie temperature, which can be selected across a range of for example between 185 and 230° C. The PTC materials can conveniently be formed into discs with openings extending through them through which gases to be heated can pass. Electrodes for powering the heater units can be provided on opposite faces of the PTC material.

The heater unit might be formed as a woven or non-woven fabric. Particularly suitable is a sheet of the fabric known as charcoal cloth, i.e. a cloth prepared by carbonising a woven sheet of viscose rayon by exposure to elevated temperature in an inert atmosphere. Alternatively, woven or non-woven carbon fibre fabric can be used, as can be any other fabric having suitable electrical properties. In another embodiment the sheet may be a moulded structure of an appropriate material, for example sintered carbon.

The filters that are included in the system will be selected according to their location and function. Preferably, the system includes at least one of (a) a first filter located in the system upstream of the first passage in the first heat exchanger, (b) a second filter located between the first passages of the first and second heat exchangers, and (c) a third filter located between the outlet from the gas purification unit and the heater. The first filter desirably comprises a cyclonic or other dust filter preceding the compressor, together with a coalescing filter following the compressor and capable of removing particulate and liquid contaminants including oil and water aerosol. The second filter is desirably a further coalescing filter with a higher efficiency rating than the first such filter. The third filter is a fine particle filter and is desirably placed between the first heat exchanger and the heater, although it could be located between the purification unit and the first heat exchanger.

The system of the invention can be used to condition air to be supplied to enclosed spaces such as in rooms, buildings, vehicles and so on. Particularly preferred applications include such spaces which might be exposed to harmful contaminants, such as vehicles and protective shelters for use in industrial or military applications.

The present invention will now be described, by way of example only, with reference to the accompanying drawings, in which.

Figure 1:
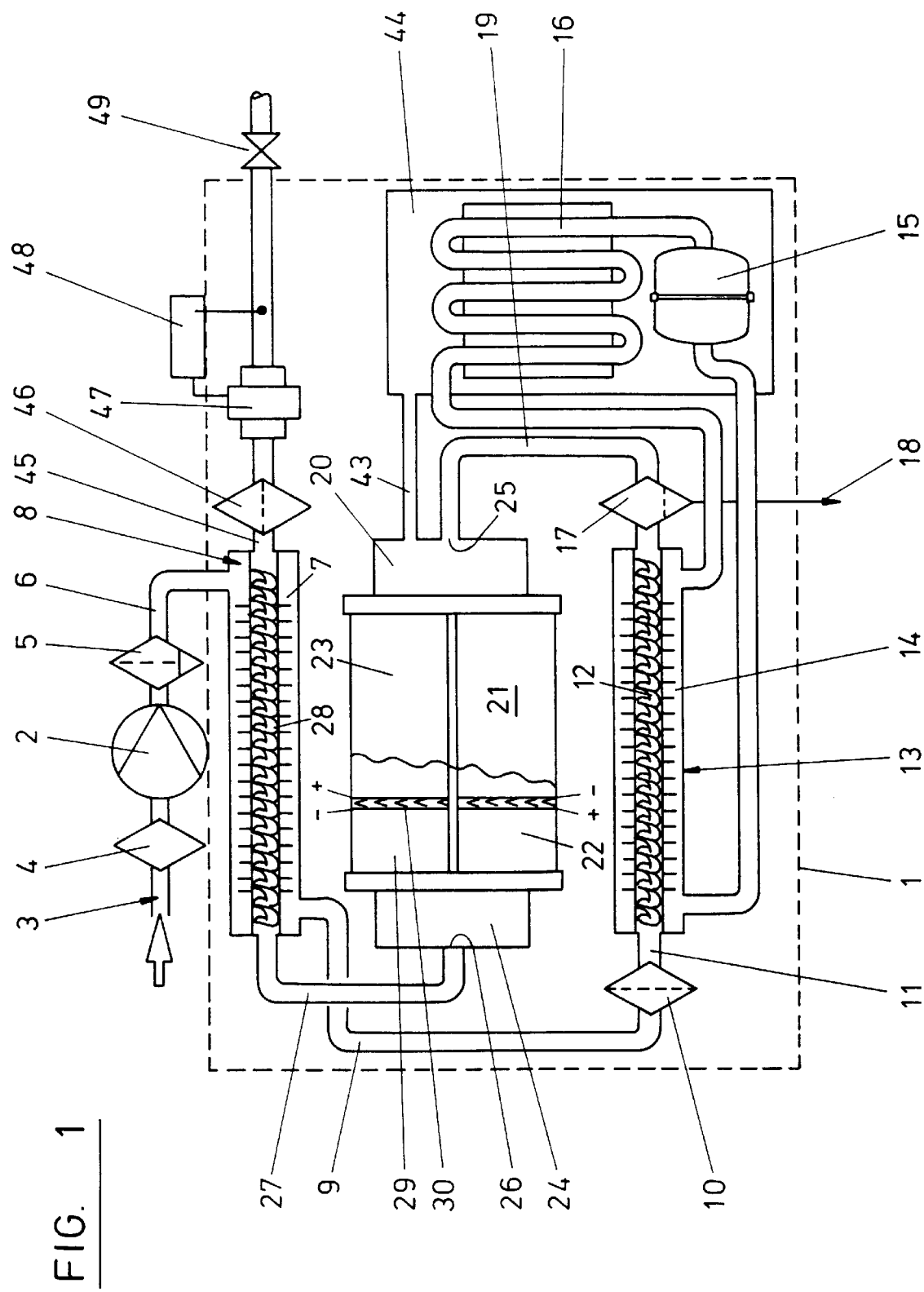
FIG. 1 is a schematic layout of the system.

Referring to the drawings, the illustrated air conditioning system shown in FIG. 1 is mostly housed in an enclosed unit 1 designed to be mounted in a vehicle. A compressor 2 driven from the engine of the vehicle draws in air from the atmosphere through an air intake 3 and a cyclonic or other dust filter 4 capable of removing relatively large particulate material. The compressor compresses the air to a system pressure that may be of the order of from 4 to 20 bar gauge and delivers the air to a coalescing filter 5. This filter may, for example, be a filter as supplied by domnick hunter limited under their OIL-X (Trade Mark) Grade AO reference and will be effective for particle removal down to 1 $\mu$m with a maximum remaining oil content of 0.5 mg.m$^{-3}$, liquid water removal in excess of 95% and penetration on DOP test of less than 0.03%.

The filtered air then passes through a pipe 6 into a first passage 7 of a first heat exchanger 8 and thence through a pipe 9 to a second coalescing filter 10 which may, for example, be a filter as supplied by domnick hunter limited under their OIL-X Grade AA reference. Such a filter is capable of particle removal down to 0.01 $\mu$m with a maximum remaining oil content of 0.01 mg.m$^{-3}$ and penetration on DOP test of less than 0.0001%. The air then passes through a pipe 11 to a first passage 12 of a second heat exchanger 13, through a second passage 14 of which is circulated a refrigerant medium.

The second passage forms part of a closed circuit refrigerant unit that includes a pump 15 driven from the vehicle electrical supply and a heat exchange section 16.

The cooled air leaving the second heat exchanger 13 will contain water that has condensed as the air cools, and is next passed through an air/water separator 17, for example a centrifugal action and impingement separator as sold by domnick hunter limited under the trade mark WS50. Separated water is discharged through a drain 18 externally of the vehicle and the dry air is led by a pipe 19 to an inlet manifold 20 of a gas purification unit 21.

The gas purification unit is a PTSA filter unit comprising two parallel pressure vessels 22, 23 of rectangular cross-section which are secured to extend between the inlet manifold 20 and an outlet manifold 24. Manifold 20 has an inlet 25 receiving air under pressure from the separator 17. Manifold 24 has an outlet 26 from which filtered gas is taken by a pipe 27 to a second passage 28 of the first heat exchanger 8.

The inlet manifold 20 incorporates valves whereby the incoming air may be directed into the inlet end of either one of the pressure vessels while the inlet end of the other vessel is closed. The outlet manifold 24 incorporates valves whereby filtered gas may be received from the outlet end of either pressure vessel and passed to the outlet 26, with a minor part of that gas flow directed as purge gas into the outlet end of the other vessel. Gas flow is controlled by a timing device so that as inlet gas flows through one vessel purge gas flows in the opposite direction through the other vessel. This method of operation is well known.

The purpose of the PTSA filter unit is to remove volatile contaminants from the incoming air. To this end each pressure vessel contains a plurality of beds 29 of adsorbent filter material, the beds being axially separated by a plurality of heater units 30. The heater units comprise discs of barium titanate with electrodes mounted on opposite faces and holes extending through the discs for flow of air through the bed in which the discs are mounted. The heaters can be connected to a 120 volt AC supply. In a vehicle, this can be provided by an appropriate power pack deriving power from the engine or the vehicle's electrical system. Suitable disc heaters of this type are available from domnick hunter limited.

Figure 2:
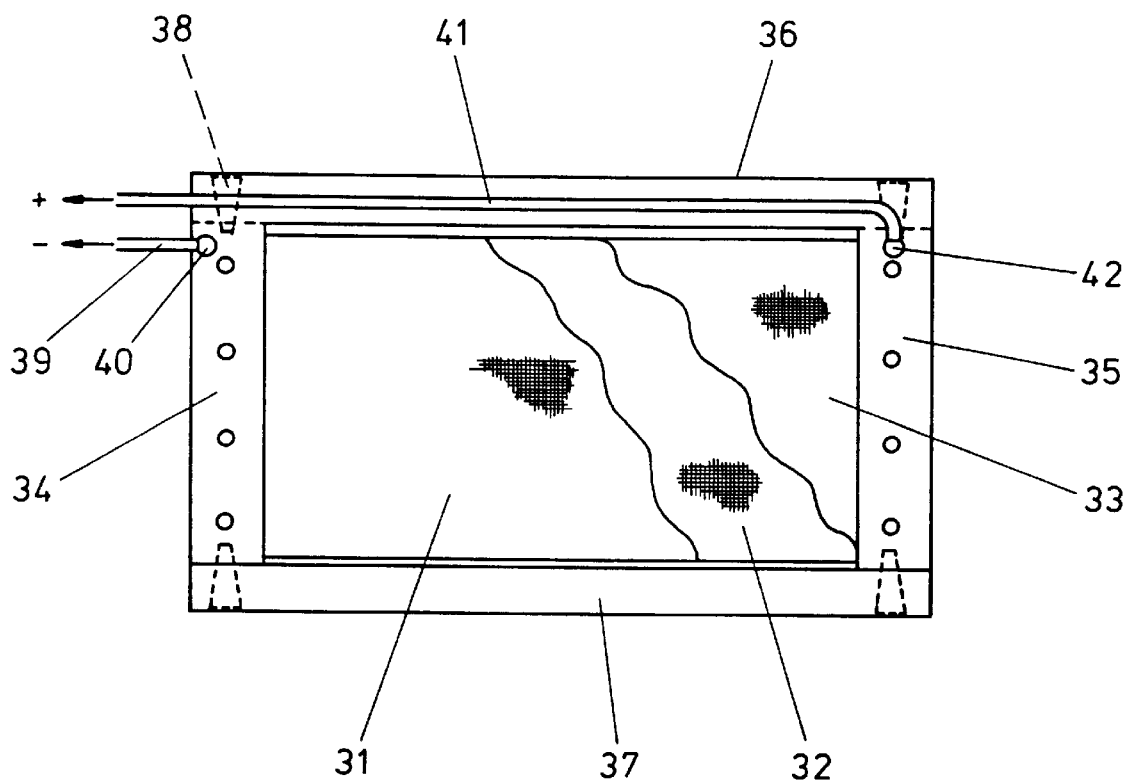
FIG. 2 is a partially cut-away plan view of a heater unit that can be used in the invention.

Another type of heater unit is described with reference to FIG. 2. It comprises three parallel sheets 31 to 33 of activated charcoal fabric. The fabric is a 1/1 plain woven fabric of approximately 13 threads/cm, weighing 110 g.m$^{-2}$ and having a thickness of approximately 0.5 mm. The air permeability of each sheet is 0.01 mm (Wg)/cm s$^{-1}$, the breaking strength of the fabric is in excess of 7.5 N.cm$^{-1}$ width and its resistivity is 6.7 ohms.cm$^{-1}$. The fabric is of viscose rayon that has been carbonised in a carbon dioxide atmosphere. This renders the fabric electrically conductive without destroying its cohesion and it also gives a controlled open porous structure to the carbon that renders it capable of adsorbing organic chemicals.

The fabric sheets extend between strip terminals 34, 35 between which opposite edges of the sheets are clamped. The terminals are secured in spaced relationship by insulating spacers 36, 37 secured to the terminals by screws such as 38. The spacing is such that the sheets 31 to 33 are held under light tension. A first insulated lead 39 has its conductive core soldered at 40 to the terminal 34 and a second insulated lead 41 extends along the spacer 36 and has its conductive core soldered at 42 to the terminal 35. The two terminals are each encapsulated by insulating material (not shown). The leads 39, 41 enable the heater unit to be connected to the vehicle 12 volt or 24 volt DC supply.

Suitable adsorbent materials for PTSA filter units are well known; they include mesoporous materials such as activated carbon, microporous materials—particularly molecular sieves such as some zeolites or a microporous carbon, and desiccants for which again certain zeolites may be suitable. Each of the beds contained in a pressure vessel may be of the same adsorbent, or beds may be of different adsorbents as required.

In order to fill each vessel either a heater assembly is inserted into the vessel to close the lower end thereof, or the lower end is closed by a foraminous screen. The required adsorbent is then snowstorm filled into the lower part of the vessel up to the required height. Snowstorm filling is a well-known technique and allows maximum packing density to be achieved. A heater assembly is then introduced into the vessel to lie above and in contact with the adsorbent material, and further adsorbent (which may be the same as or different to the first) is snowstorm filled on top of this assembly. The steps are repeated until the vessel has been filled and the required number of heater assemblies are in position.

Electrical connection to the heater assemblies may be made through pressure glands in the wall of the vessel, or electrical leads may be brought upwardly through the bed or beds to the top of the vessel and thence out from the manifold when this is connected to the vessel.

The purpose of the purge gas flow in the reverse direction through the adsorbent beds in either pressure vessel is to strip the adsorbed contaminants from the adsorbent materials, so regenerating those materials. The purge gas is exhausted from the manifold 20 to pipe 43 and is allowed to expand into a chamber 44 surrounding the exterior of the heat exchange section 16 of the refrigerant unit. This expansion cools the purge gas, which in turn cools the heat exchange section, the gas then being exhausted to atmosphere.

Although some contaminants can be removed at low temperatures, in order to achieve full regeneration it is preferred that all contaminants are removed that have a boiling point between approximately −90° C. and 200° C. This requires that the purge gas be rapidly heated to and maintained at a temperature in excess of 200° C. and the heater units as described have been found to be capable of performing this function. The gas flowing in the purge direction is heated before it enters the first one of the adsorbent beds, and accordingly all beds can effectively be regenerated. Generally speaking, it may be preferred that contaminants with higher boiling points are adsorbed in the upstream beds within each pressure vessel. Thus, the heating units may be operated at different temperatures, with higher temperatures being applicable to the upstream (downstream in purge direction) heater units. The heaters can therefore be individually controlled, e.g. by thermocouples located as appropriate in the adsorbent beds or to achieve different maximum temperatures. Heater control can also involve timing the on/off cycle of individual heaters as required.

Despite the relatively high temperature of the purge air leaving the purification unit it is found that expansion into the chamber 44 cools this air sufficiently to allow adequate cooling of the heat exchange section 16 of the refrigerant unit.

In PTSA filtration once purging to exhaust of one of the pressure vessels has been completed it is usual to close the purge outlet while continuing to allow purge gas to flow into that vessel in order to pressurise the vessel in preparation for it being exposed to incoming gas when the functions of the vessels are changed over. It is important that by the end of this pressurisation the bed temperatures are sufficiently low to allow the adsorbents to function effectively. Thus rapid cooling of the heater units is as important as rapid heating of those units, and this is allowed by the heater units described. It is also enhanced by the fact that the air that passes into the purification unit from pipe 19 has been cooled to a low temperature by passage through the successive heat exchangers 8 and 13.

The air leaving the outlet 26 from the purification unit passes through pipe 27 to the second passage 28 of the first heat exchanger 8. As it passes through this heat exchanger it is warmed while cooling the air delivered from the filter 5. On leaving the heat exchanger it passes through pipe 45 into a final filter 46, for example a filter as supplied by domnick hunter limited under their Grade AR reference, capable of particle removal down to 1 $\mu$m and of penetration on DOP test of less than 0.03%. This filter will remove any dust that may have been shed from the filter beds of the purification unit. The air then passes into a heater 47, which is again preferably a charcoal fabric heater powered from the vehicle electrical supply. This heater is controlled by a control unit 48, which may be of the proportional, integral or derivative control type. Many different types of controller are known which are capable of maintaining the delivered air at a pre-set temperature and any of these is suitable. The heated and purified air is then delivered through valve 49 to the interior of the vehicle or into a sealed crew enclosure within the vehicle.

In order to improve the controllability of the temperature of the finally delivered air it may be advantageous to include a bypass of the second passage of the first heat exchanger, directly connecting pipes 29 and 45. Any bypass arrangement will desirably include a valve for controlling the proportion of the air that is directed through the heat exchanger and through the bypass.

Operation of the system is evident from the foregoing description. It will be appreciated that air of exceptionally high purity can be delivered even from a heavily contaminated input and that the system can be operated in an energy efficient manner from power sources that already exist on the vehicle to which it is fitted.

It will be understood that modifications may be made to the specific arrangement shown in the drawings and described herein. Each of the individual filters and the air/water separator may he replaced by a unit other than that specified. The air purification unit need not be a PTSA unit, but may simply be a PSA unit, and in either case any of a number of available designs of unit may be suitable. When a PTSA unit is used then the heater may be of different form, including conventional heaters. The two pressure vessels of the PTSA or PSA unit should desirably be of the same cross-section, but that cross-section may be of any desired configuration. Preferred are vessels of uniform circular or rectangular section; if the heater assemblies are of carbon cloth trapped between upper and lower rigid frames, as described, the cross-section of the frames will match that of the pressure vessels so that each heater assembly is a close fit into its pressure vessel.

I claim:

1. An air conditioning system for conditioning air to be supplied to an enclosed space, which comprises:

(a) an air intake to be positioned externally of the space, (b) a compressor, (c) a first heat exchanger having first and second counterflow passages, (d) a second heat exchanger having first and second counterflow passages, (e) an air/water separator, (f) a twin bed gas purification unit comprising (i) first and second parallel filter beds, (ii) valve means for directing air from an inlet to flow through the first filter bed and for directing purified air from the first bed so that a greater proportion flows to an outlet while a smaller proportion flows in counter direction as purge gas through the second bed and then to a purge outlet, (iii) a plurality of heater units at spaced apart locations along each of the filter beds for heating a gas as it flows through the heater bed, and (iv) means for controlling the heater, (g) connecting means directing air to flow in series from the air intake to the compressor then through the first passage of the first heat exchanger, through the first passage of the second heat exchanger and through the air/water separator to the inlet of the purification unit, then from the outlet of the purification unit through the second passage of the first heat exchanger and through the heater f or delivery into the space, (h) a plurality of filters for filtering gas flowing through the system, and (i) a closed circuit refrigerant unit including means for circulating cooled refrigerant through the second passage of the second heat exchanger and means for cooling the exterior of a heat exchange section of the refrigerant unit.

2. An air conditioning system as claimed in claim 1, in which at least three heater units are provided in each of the filter beds.

3. An air conditioning system as claimed in claim 1, in which the heater units are in the form of discs arranged across the filter beds, which have openings extending across them through which the gas passing through the filter bed can pass.

4. An air conditioning system as claimed in claim 1, in which the heater units are controlled so as to limit the maximum temperature to which the filter bed is heated.

5. An air conditioning system as claimed in claim 1, in which the first filter means comprises a dust filter upstream of the compressor.

6. An air conditioning system as claimed in claim 1, in which the first filter means comprises a coalescing filter.

7. An air conditioning system as claimed in claim 6, in which the second filter means comprises a coalescing filter which has a higher efficiency rating than the coalescing filter of the first filter means.

8. An air conditioning system as claimed in claim 1, in which the third filter means comprises a fine particle filter.

9. An air conditioning system as claimed in claim 8, in which the third filter means is located between the first heat exchanger and the heater.

10. An air conditioning system as claimed in claim 1, in which the filters comprise at least one of (a) a first filter located in the system upstream of the first passage in the first heat exchanger, (b) a second filter located between the first passages of the first and second heat exchanges, and (c) a third filter located between the outlet from the gas purification unit and the heater.

11. A vehicle having an air conditioning system as claimed in any claim 1 fitted to it.

* * * * *